United States Patent
Constantin et al.

(10) Patent No.: US 11,286,977 B2
(45) Date of Patent: Mar. 29, 2022

(54) STACKED THRUST TAPERED DISSIMILAR SERIES ROLLER BEARING

(71) Applicant: The Timken Company, North Canton, OH (US)

(72) Inventors: Florin M. Constantin, Wittenheim (FR); Daniel F. Stanciu, Ploiesti (RO)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 17/433,642

(22) PCT Filed: Jul. 22, 2020

(86) PCT No.: PCT/US2020/043014
§ 371 (c)(1),
(2) Date: Aug. 25, 2021

(87) PCT Pub. No.: WO2021/126314
PCT Pub. Date: Jun. 24, 2021

(65) Prior Publication Data
US 2022/0042542 A1 Feb. 10, 2022

Related U.S. Application Data

(60) Provisional application No. 62/950,458, filed on Dec. 19, 2019.

(51) Int. Cl.
*F16C 19/30* (2006.01)
*F16C 19/54* (2006.01)
(Continued)

(52) U.S. Cl.
CPC .......... *F16C 19/30* (2013.01); *F16C 19/305* (2013.01); *F16C 19/54* (2013.01); *F16C 19/56* (2013.01);
(Continued)

(58) Field of Classification Search
CPC ........ F16C 19/30; F16C 19/305; F16C 19/54; F16C 19/56; F16C 19/58; F16C 33/583
(Continued)

(56) References Cited

U.S. PATENT DOCUMENTS 1,191,862 A * 7/1916 Williams ................ F16C 19/30
384/594
1,885,852 A 11/1932 Medved
(Continued)

FOREIGN PATENT DOCUMENTS

BE 841002 A * 10/1976 .......... B30B 11/241
CN 2445136 Y * 8/2001 .............. F16C 19/54
(Continued)

OTHER PUBLICATIONS

Alibaba, "Double Roller Thrust Bearing," <https://www.alibaba.com/showroom/double-roller-thrust-bearing.html> web page visited Nov. 12, 2019.
(Continued)

*Primary Examiner* — Marcus Charles
(74) *Attorney, Agent, or Firm* — Michael Best & Friedrich LLP

(57) ABSTRACT

A thrust bearing includes a first axial end washer defining thereon a first race, a second axial end washer defining thereon a second race, a one-piece, radially-inner washer having a first axial end engaged with the first axial end washer and having a second axial end defining thereon a third race, and a one-piece, radially-outer washer having a first axial end defining thereon a fourth race and having a second axial end engaged with the second axial end washer. A first set of tapered rolling elements is supported between the first race and the fourth race and a second set of tapered rolling elements is supported between the second race and the third race. The first and second sets of tapered rolling
(Continued)

elements are both axially and radially offset from one another.

20 Claims, 2 Drawing Sheets

(51) Int. Cl.
    *F16C 19/56*     (2006.01)
    *F16C 33/58*     (2006.01)

(52) U.S. Cl.
    CPC ........ *F16C 33/583* (2013.01); *F16C 2352/00* (2013.01)

(58) Field of Classification Search
    USPC .................. 384/572, 615, 618, 619, 621
    See application file for complete search history.

(56) References Cited

U.S. PATENT DOCUMENTS

| | | | |
|---|---|---|---|
| 2,374,820 A * | 5/1945 | Kaye | F16C 19/54 384/619 |
| 2,538,229 A | 1/1951 | Boden | |
| 3,556,618 A * | 1/1971 | Toth | F16C 33/761 384/608 |
| 3,712,693 A | 1/1973 | Root et al. | |
| 4,085,984 A | 4/1978 | Cameron | |
| 4,513,630 A | 4/1985 | Pere et al. | |
| 5,509,331 A * | 4/1996 | Nickipuck | B25B 13/461 81/58.3 |
| 6,015,264 A * | 1/2000 | Violette | B64C 11/06 384/517 |
| 6,464,401 B1 | 10/2002 | Allard | |
| 7,572,061 B2 | 8/2009 | Fox et al. | |
| 7,775,722 B2 | 8/2010 | Friedl et al. | |
| 8,177,438 B2 | 5/2012 | Waseda | |
| 8,602,193 B2 * | 12/2013 | Clark | B63H 23/30 192/11 OB |
| 8,662,474 B2 | 3/2014 | Schlarman et al. | |
| 9,360,045 B2 * | 6/2016 | Ai | F16C 19/505 |
| 9,382,940 B2 | 7/2016 | Lee et al. | |
| 9,512,874 B2 | 12/2016 | Hennig | |
| 9,658,132 B2 | 5/2017 | Gallimore et al. | |
| 2008/0232731 A1 | 9/2008 | Venter | |
| 2009/0081040 A1 | 3/2009 | Ueno et al. | |
| 2010/0040320 A1 * | 2/2010 | Clark | B63H 23/08 384/557 |

FOREIGN PATENT DOCUMENTS

| | | | | |
|---|---|---|---|---|
| CN | 1382920 A | * | 12/2002 | ............. F16C 19/30 |
| CN | 2634179 Y | * | 8/2004 | ............. F16C 19/30 |
| CN | 102203465 A | * | 9/2011 | ............. F16C 19/52 |
| CN | 105003221 B | * | 5/2017 | ............. E21B 29/06 |
| DE | 1817864 A1 | | 10/1972 | |
| DE | 102006061378 B3 | | 3/2008 | |
| DE | 102013202387 A1 | | 8/2014 | |
| RU | 2728499 C1 | * | 7/2020 | ............. F16C 19/54 |
| WO | 2019195746 A1 | | 10/2019 | |

OTHER PUBLICATIONS

ISB Industries, "Tapered Roller Thrust Bearings, Double Direction," catalog available at <https://www.isb-industries.com/en/bearings-and-components/double-direction-tapered-roller-thrust-bearings/> catalog pp. 232 and 233, web page visited Nov. 12, 2019.
Brands FV, "350981C Double Direction Tapered Roller Thrust Bearing," <http://stock.fv-bearing.com/index.php?route=product/product&path=25_28_36&product_id=305&sort=pd.name&order=ASC> web page visited Nov. 12, 2019.
Jinan Top Bearing Co., LTD, "351019C Double Direction Tapered Roller Thrust Bearing 220×300×96mm 528876," <https://www.groove-ballbearing.com/sale-11971276-351019c-double-direction-tapered-roller-thrust-bearing-220×300×96mm-528876.html> web page visited Nov. 12, 2019.
Timken, "Timken Thrust Bearing Catalog," © 2016, 138 pages, see especially p. 18.
Image of a stacked tapered roller bearing, disclosed to client in 2012 (1 page).
AEC, "Double Direction Tapered Roller Thrust Bearings," <https://www.aec.com/trtbdd.html> web page visited Feb. 27, 2019.
International Search Report and Written Opinion for Application No. PCT/US2020/043014 dated Oct. 27, 2020 (13 pages).

* cited by examiner

STACKED THRUST TAPERED DISSIMILAR SERIES ROLLER BEARING

RELATED APPLICATIONS

This application claims the benefit of U.S. Provisional Patent Application No. 62/950,458 filed Dec. 19, 2019, the entire content of which is hereby incorporated by reference herein.

BACKGROUND

The present invention relates to thrust bearings, and more particularly to thrust bearings used in top drive applications for the drilling industry.

The top drive application represents the technical core of a drilling rig, with the thrust bearing being the machine element that supports the weight of the pipe length within the drilling well and the main drilling efforts. In most cases, tapered roller thrust bearings, such as thrust tapered heavy duty (TTHD) and thrust tapered heavy duty flat race (TTHDFL) bearings are used for this critical position, which experiences high loads and significant deformation.

A current challenge relates to the necessary increase of the top drive capacity. Oil and gas extraction depth is continuously increasing due to the increase in global oil and gas demand and the rapid decrease of reserves within existing deposit and exploitations closer to the earth's surface. Increasing the capacity of the existing top drive bearings requires increasing the size of the bearing, including enlarging the rollers and increasing the bore diameter and the outer diameter of the bearing. However, existing drilling equipment cannot accommodate such enlargement of the bearings, and furthermore, manufacturers of new drilling equipment are not ready to change designs to accommodate larger bearings. While custom modifications could be made, these would be expensive.

SUMMARY

The current invention provides a new design for a thrust bearing that fits within the existing envelope (e.g., bearing bore and outer diameter) for top drive applications, yet increases the bearing's rating and capacity well beyond that of existing TTHD and TTHDFL bearings.

In one aspect, the disclosure provides a thrust bearing including a first axial end washer defining thereon a first race, a second axial end washer defining thereon a second race, a one-piece, radially-inner washer having a first axial end engaged with the first axial end washer and having a second axial end defining thereon a third race, and a one-piece, radially-outer washer having a first axial end defining thereon a fourth race and having a second axial end engaged with the second axial end washer. A first set of tapered rolling elements is supported between the first race and the fourth race and a second set of tapered rolling elements is supported between the second race and the third race. The first and second sets of tapered rolling elements are both axially and radially offset from one another.

In one aspect, there are no spacers positioned between the first axial end washer and the radially-inner washer, or between the second axial end washer and the radially-outer washer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
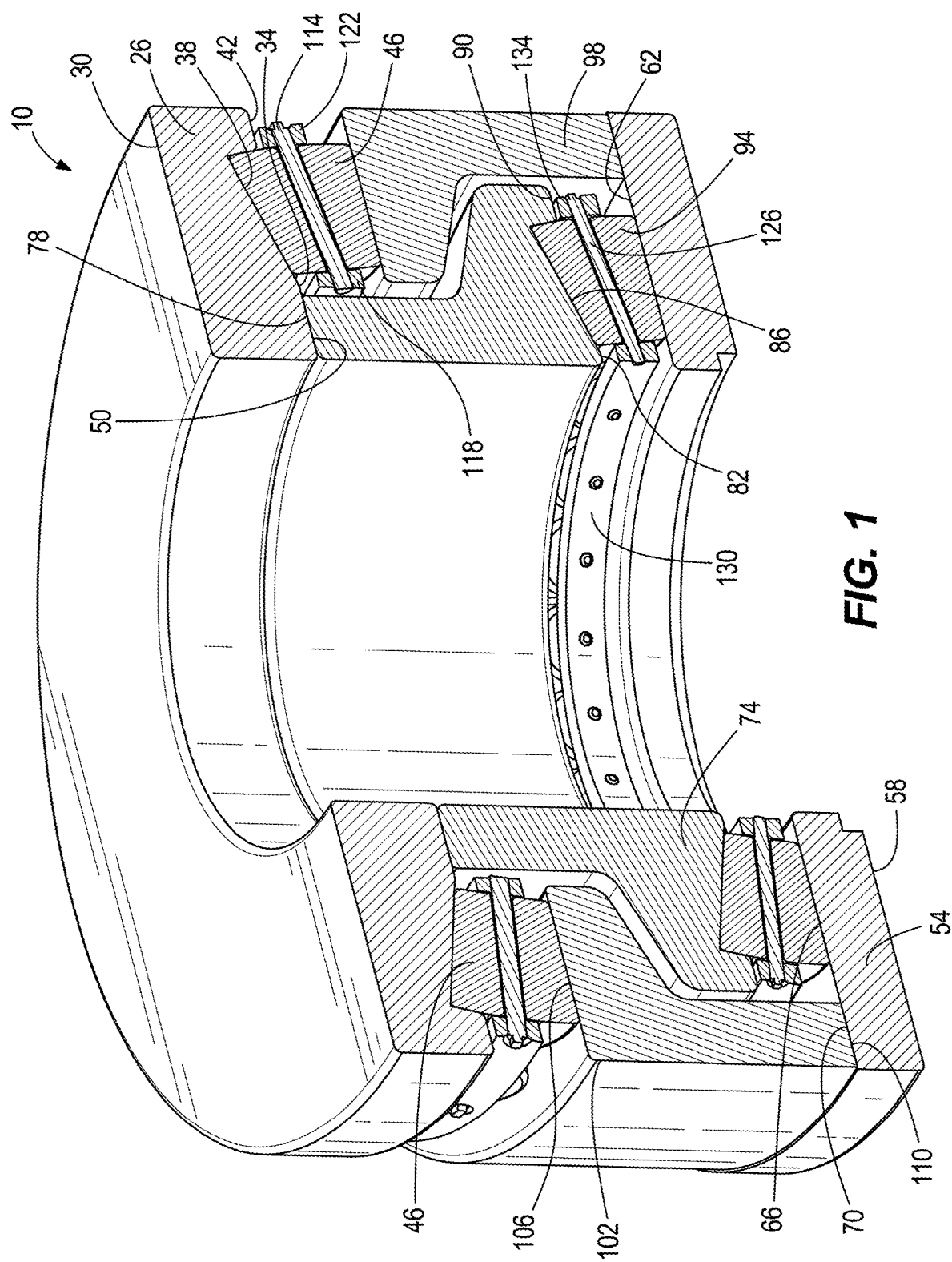
FIG. 1 is a perspective view, partially cut away, of a stacked thrust tapered dissimilar series roller bearing embodying the invention.
Figure 2:
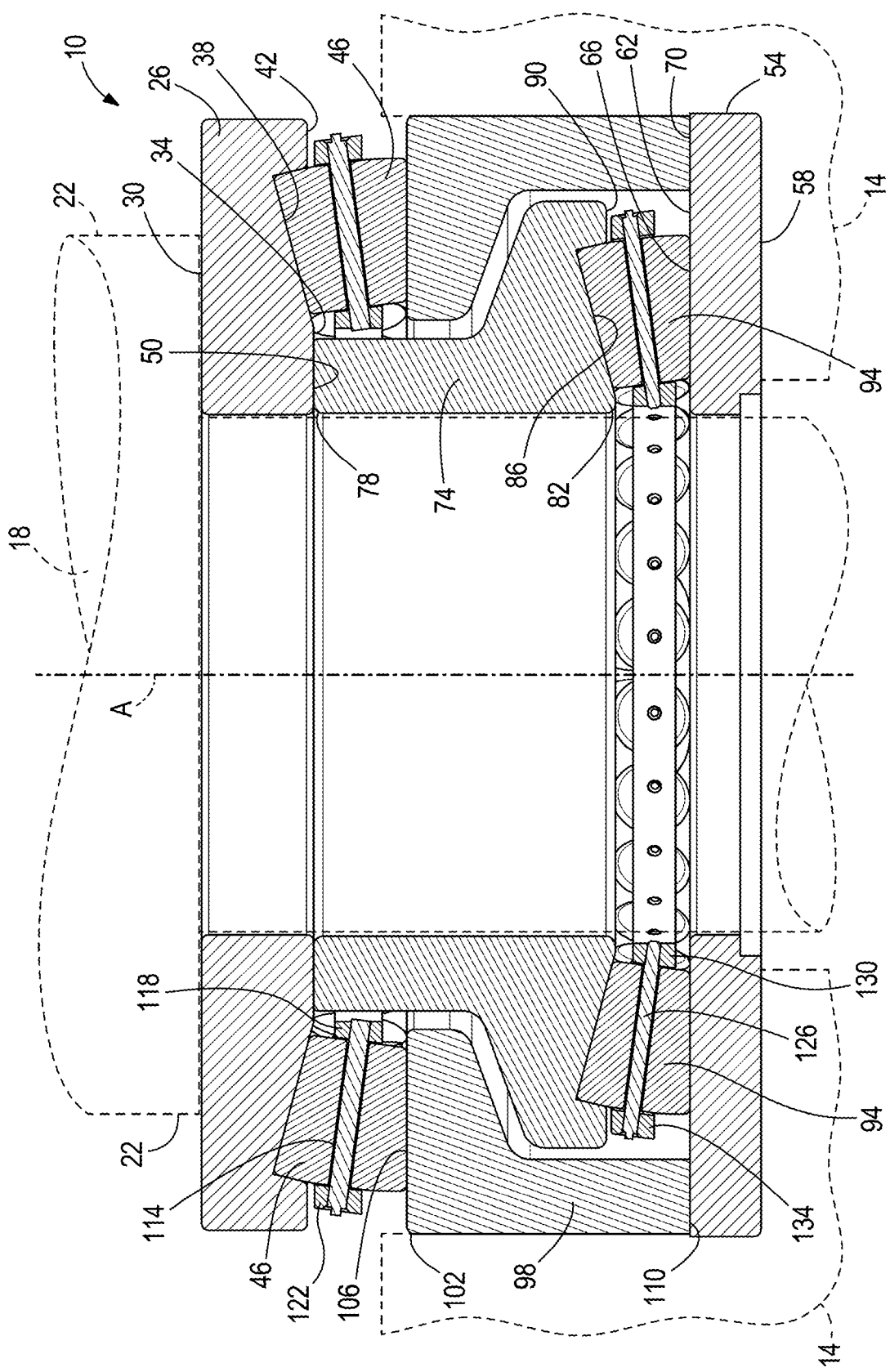
FIG. 2 is a section view of the bearing of FIG. 1.

FIGS. 1 and 2 illustrate a stacked thrust tapered dissimilar series roller bearing 10 according to the invention. The illustrated bearing 10 can be used in the top drive of a drilling rig or in other applications. As shown in FIG. 2, the bearing 10 is supported in a housing 14 to support thrust loading on a rotating shaft 18. The shaft 18 includes a shoulder 22 that engages an axial end surface of the bearing 10, as will be discuss further below.

The bearing 10 includes a first axial end washer 26, which in the illustrated embodiment is the top or upper axial end washer of the bearing 10. The annular washer 26 has a radially-inner diameter that defines, in part, a bore of the bearing 10, and a radially outer diameter that is smaller than the outer-most diameter of the bearing 10. The first axial end washer 26 includes an axial outer (i.e., upper) surface 30 configured to engage the shoulder 22, and an axial inner (i.e., lower) surface 34 that defines thereon a first race 38. The axial inner surface 34 further includes a rib portion 42 configured to radially constrain a first set of tapered rolling elements 46 on the first race 38 and an abutment location 50, the purpose of which will be described further below. The illustrated first race 38 is a tapered race, meaning that it is oblique to a longitudinal axis A of the bearing 10.

The bearing 10 further includes a second axial end washer 54, which in the illustrated embodiment is the bottom or lower axial end washer of the bearing 10. The annular washer 54 has a radially-inner diameter that may define, in part, the bore of the bearing 10 or may be slightly larger than the bore diameter, and a radially outer diameter that defines, in part, the outer or outer-most diameter of the bearing 10. The second axial end washer 54 includes an axial outer (i.e., lower) surface 58 configured to engage the housing 14, and an axial inner (i.e., upper) surface 62 that defines thereon a second race 66. The axial inner surface 62 is planar and further includes an abutment location 70, the purpose of which will be described further below. The illustrated second race 66 is a flat race, meaning that it is perpendicular to the longitudinal axis A of the bearing 10.

The bearing 10 also includes a one-piece, radially-inner washer 74 having a first axial end 78 (i.e., upper end) engaged with the first axial end washer 26 at the abutment location 50, and a second axial end 82 (i.e., lower end) defining thereon a third race 86. The second axial end 82 further includes a rib portion 90 configured to radially constrain a second set of tapered rolling elements 94 on the third race 86. The illustrated third race 86 is a tapered race, meaning that it is oblique to the longitudinal axis A of the bearing 10. The radially-inner washer 74 is generally L-shaped in cross-section, with the first axial end 78 being thinner in the radial direction than the second axial end 82. With this arrangement, the third race 86 is at least partially cantilevered relative to the first axial end 78. The washer 74 has a radially-inner diameter that defines, in part, the bore of the bearing 10, while a radially-outermost diameter of the washer 74 does not extend to the outer or outer-most diameter of the bearing 10.

The bearing 10 further includes a one-piece, radially-outer washer 98 having a first axial end 102 (i.e., upper end) defining thereon a fourth race 106, and a second axial end 110 (i.e., lower end) engaged with the second axial end washer 54 at the abutment location 70. The illustrated fourth race 106 is a flat race, meaning that it is perpendicular to the longitudinal axis A of the bearing 10. The radially-outer washer 98 is generally L-shaped in cross-section, with the second axial end 110 being thinner in the radial direction than the first axial end 102. With this arrangement, the fourth race 106 is at least partially cantilevered relative to the second axial end 110. The washer 98 has a radially-outer diameter that defines, in part, the outer or outer-most diameter of the bearing 10, while a radially-innermost diameter of the washer 98 does not extend to the bore of the bearing 10.

The first set of tapered rolling elements 46 is part of a pin-type cage and roller assembly that includes the rolling elements 46, pins 114 that pass through the respective longitudinal axes of the rolling elements 46, an inner cage ring 118 that supports the radially-inner ends of the pins 114, and an outer cage ring 122 that supports the radially-outer ends of the pins 114. The first set of tapered rolling elements 46 is supported between the first race 38 and the fourth race 106 for rolling thereon. In other embodiments, the rolling elements 46 need not be part of a pin-type cage and roller assembly, but instead can be guided by other types of cages, such as stamped steel, machined steel or brass, polymer, etc.

The second set of tapered rolling elements 94 is also part of a pin-type cage and roller assembly that includes the rolling elements 94, pins 126 that pass through the respective longitudinal axes of the rolling elements 94, an inner cage ring 130 that supports the radially-inner ends of the pins 126, and an outer cage ring 134 that supports the radially-outer ends of the pins 126. The second set of tapered rolling elements 94 is supported between the second race 66 and the third race 86 for rolling thereon. In other embodiments, the rolling elements 94 need not be part of a pin-type cage and roller assembly, but instead can be guided by other types of cages, such as stamped steel, machined steel or brass, polymer, etc.

As seen in the figures, the first set of rolling elements 46 is both radially and axially offset from the second set of rolling elements 94, and as shown, the first set 46 is offset radially outwardly from the second set 94. Furthermore, as seen in the figures, the smaller diameter ends of both sets of rolling elements 46, 94 are positioned radially inwardly from the larger diameter ends. By virtue of each of the second and fourth races 66 and 106 being flat races, the first and second sets of rolling elements 46, 94 can be said to roll about parallel planes. The first and second sets of rolling elements 46, 94 are considered to be different "series" from one another in that the geometry (e.g., the end diameters and length), and possibly the number, of rolling elements is different from the first set 46 to the second set 94. The radial offset between the first and second sets of rolling elements 46, 94 at least partly contributes to the need for using the different "series" of rolling elements in the bearing 10. The result of using the different series of rolling elements is to obtain greater axial stiffness and to accommodate the radial wall thickness of the washers 74 and 98. Additionally, the different "series" means that each set of rolling elements 46, 94 can have different load ratings.

The bearing 10 is designed such that only four components are provided to define the four races 38, 66, 86, and 106 and to structurally support the first and second sets of rolling elements 46, 94. More specifically, only the first and second axial end washers 26, 54, the one-piece, radially-inner washer 74 and the one-piece, radially-outer washer 98 are used to define the four races 38, 66, 86, and 106 in the illustrated, load-supporting configuration. No separate spacers or other intervening components are provided at the interface between the first axial end washer 26 and the radially-inner washer 74, as the first axial end 78 of the radially-inner washer 74 directly abuts the axial inner surface 34 of the first axial end washer 26 at the abutment location 50. Likewise, no separate spacers or other intervening components are provided at the interface between the second axial end washer 54 and the radially-outer washer 98, as the second axial end 110 of the radially-outer washer 98 directly abuts the axial inner surface 62 of the second axial end washer 54 at the abutment location 70. By eliminating any intervening components at these locations, and therefore minimizing the number of component interfaces, the overall axial stiffness of the bearing 10 is increased as compared to a similar arrangement including spacers. This increased stiffness results in decreased deflection and buckling tendencies under high loading conditions.

During use, load is applied axially to the bearing 10 by the shoulder 22 of the rotating shaft 18. The load is transmitted directly onto the axial outer surface 30 of the first axial end washer 26. The load is then transmitted equally or non-equally (depending on the internal pre-defined axial settings—e.g., equally for line-to-line mounted setting) onto the first and second rows of rolling elements 46, 94. A first portion of the load is carried by the first set of rolling elements 46 and transmitted through the radially-outer washer 98 and the second axial end washer 54 into the housing 14. Another portion of the load is transmitted through the radially-inner washer 74 to the second set of rolling elements 94, and then to the second axial end washer 54 and into the housing 14. The flat races (i.e., the second and fourth races 66, 106) insure a non-constrained radial positioning of the assembly by maintaining the advantage of true rolling motion that is specific to tapered roller bearings. Note that the flat races (i.e., the second and fourth races 66, 106) are on components (i.e., the second axial end washer 54 and the radially-outer washer 98) that are downstream (in the sense of load transmission direction) of the respective sets of rolling elements 46, 94 and that transmit loading into the housing 14, while the tapered or profiled races (i.e., the first and third races 38, 86) are on components (i.e., the first axial end washer 26 and the radially-inner washer 74) that are upstream (in the sense of load transmission direction) of the respective sets of rolling elements 46, 94 and that receive loading from the shaft 18. Relative to existing cylindrical roller bearings in stacked assemblies, this stacked tapered roller bearing 10 ensures the true rolling motion of rollers, while allowing for increased speeds, decreased friction (no sliding at the race-roller interfaces), and ideal radial positioning due to the use of the flat races (no hyper-static radial mounting and functioning).

This stacked mounting arrangement of the bearing 10 provides an increased bearing rating as compared to existing TTHD and TTHDFL bearings, and does so within the same fixed envelope (i.e., bearing bore and bearing outer diameter) into which the existing TTHD and TTHDFL bearings must fit. Again, the bearing envelope is set by the manufacturers of the drill rig equipment and cannot be easily modified. Theoretical calculations have shown about a twenty percent increase in bearing rating due to this "vertical" stacking arrangement, which has resulted in nearly double the bearing life with increased maintenance efficiency. For line-to-line (zero) axial mounted setting, there is a theoretical equal split of the axial load due to the parallel mode mounting and transmission manner of mounting. The bearing assembly rating is, in this case, twice the rating of the smaller-rated of the two rows of rolling elements 46, 94, which in the illustrated embodiment is the lower set of rolling elements 94. There is also the possibility to further increase the bearing assembly rating by using this differential rating feature, and respectively, the differential loading capabilities with the bearing 10. Fine-tuning of the internal settings (i.e, axial and lateral bench settings—endplay or preload, depending on application needs and load dispatching) can be obtained by changing the dimensions of the radially-inner washer 74 to change the bearing setting.

The specific, yet easy-to-manufacture L-shaped geometries of the radially-inner and radially-outer washers 74, 98 can be tailored to create the desired gap or spacing between those two components, while maintaining the desired bending stiffness. Care is taken to ensure the gaps are large enough to accommodate normal operating deflection without interference. Further, the gaps should ensure appropriate oil flow within the bearing 10. It is also possible to provide oil holes within lateral sides of the radially-inner and radially-outer washers 74, 98 to provide extra oil flow inside the bearing 10 if needed. The radially-inner and radially-outer washers 74, 98 can be configured to accepts such additional oil holes without negatively impacting their structural stiffness.

Various features of the invention are set forth in the following claims.

What is claimed is:

1. A thrust bearing, comprising:
    a first axial end washer defining thereon a first race;
    a second axial end washer defining thereon a second race;
    a one-piece, radially-inner washer having a first axial end engaged with the first axial end washer and having a second axial end defining thereon a third race;
    a one-piece, radially-outer washer having a first axial end defining thereon a fourth race and having a second axial end engaged with the second axial end washer;
    a first set of tapered rolling elements supported between the first race and the fourth race; and
    a second set of tapered rolling elements supported between the second race and the third race;
    wherein the first and second sets of tapered rolling elements are both axially and radially offset from one another.

2. The thrust bearing of claim 1, wherein the first set of tapered rolling elements is offset radially outwardly from the second set of tapered rolling elements.

3. The thrust bearing of claim 1, wherein the first and third races are oblique to a longitudinal axis of the bearing, and wherein the second and fourth races are perpendicular to the longitudinal axis of the bearing.

4. The thrust bearing of claim 1, wherein the radially-inner washer and the radially-outer washer are both generally L-shaped in cross-section.

5. The thrust bearing of claim 1, wherein the first and second sets of tapered rolling elements are pin-type rollers with the first set of tapered rolling elements supported by an inner cage ring and an outer cage ring, and with the second set of tapered rolling elements supported by an inner cage ring and an outer cage ring.

6. The thrust bearing of claim 1, wherein a radially inner diameter of the first axial end washer and the radially-inner washer define a bore diameter of the thrust bearing.

7. The thrust bearing of claim 6, wherein the radially-outer washer does not define a portion of the bore diameter.

8. The thrust bearing of claim 6, wherein a radially outer diameter of the second axial end washer and the radially-outer washer define an outer diameter of the thrust bearing.

9. The thrust bearing of claim 8, wherein the radially-inner washer does not define a portion of the outer diameter of the thrust bearing.

10. The thrust bearing of claim 1, wherein no spacers are positioned between the first axial end washer and the radially-inner washer, or between the second axial end washer and the radially-outer washer.

11. The thrust bearing of claim 1, wherein the first axial end washer is configured to engage a shoulder of a shaft received through the thrust bearing, such that axial load is transferred from the shaft to the first axial end washer.

12. The thrust bearing of claim 11, wherein approximately half of an axial load applied to the first axial end washer is carried by the first set of tapered rolling elements and approximately half of the axial load applied to the first axial end washer is carried by the second set of tapered rolling elements for a line-to-line mounted setting.

13. The thrust bearing of claim 1, wherein both of the first and second set of tapered rolling elements are arranged such that smaller diameter ends of the rolling elements are positioned radially inwardly from larger diameter ends of the rolling elements.

14. The thrust bearing of claim 1, wherein rolling elements in the first set of tapered rolling elements have a different geometry than rolling elements in the second set of tapered rolling elements.

15. The thrust bearing of claim 1, wherein the first set of tapered rolling elements has a different number of rollers than the second set of tapered rolling elements.

16. The thrust bearing, of claim 1, wherein the second axial end washer has a planar surface, the planar surface including the second race and at least partially defining a location where the radially-outer washer abuts the second axial end washer.

17. The thrust bearing of claim 1, wherein the first axial end washer has an axial outer surface configured to engage a shoulder of a shaft received through the thrust bearing, and an axial inner surface, the axial inner surface including the first race, a rib portion configured to radially constrain the first set of tapered rolling elements on the first race, and a location where the radially-inner washer abuts the first axial end washer.

18. A thrust bearing comprising:
    a first axial end washer defining thereon a first race oriented oblique to a longitudinal axis of the bearing;
    a second axial end washer defining thereon a second race oriented perpendicular to the longitudinal axis;
    a one-piece, radially-inner washer having a first axial end engaged with the first axial end washer, and having a second axial end defining thereon a third race oriented oblique to the longitudinal axis of the bearing;
    a one-piece, radially-outer washer having a first axial end defining thereon a fourth race oriented perpendicular to the longitudinal axis, and having a second axial end engaged with the second axial end washer;

a first set of tapered rolling elements supported between the first race and the fourth race; and a second set of tapered rolling elements supported between the second race and the third race;

wherein the first and second sets of tapered rolling elements are both axially and radially offset from one another with the first set of tapered rolling elements being radially outside of the second set of tapered rolling elements.

19. The thrust bearing of claim 18, wherein the first and second sets of tapered rolling elements are pin-type rollers with the first set of tapered rolling elements supported by an inner cage ring and an outer cage ring, and with the second set of tapered rolling elements supported by an inner cage ring and an outer cage ring.

20. The thrust bearing of claim 18, wherein the first axial end washer is configured to engage a shoulder of a shaft received through the thrust bearing, such that axial load is transferred from the shaft to the first axial end washer, and wherein approximately half of an axial load applied to the first axial end washer is carried by the first set of tapered rolling elements and approximately half of the axial load applied to the first axial end washer is carried by the second set of tapered rolling elements for a line-to-line mounted setting.

* * * * *